(12) United States Patent
Kossentini

(10) Patent No.: US 7,890,221 B2
(45) Date of Patent: Feb. 15, 2011

(54) METHOD AND DEVICE FOR CONSOLIDATION BY SOFTWARE SYNCHRONISATION IN FLIGHT CONTROL COMPUTERS

(75) Inventor: Chiheb Kossentini, Toulouse (FR)

(73) Assignee: Airbus France, Toulouse (FR)

( * ) Notice: Subject to any disclaimer, the term of this patent is extended or adjusted under 35 U.S.C. 154(b) by 908 days.

(21) Appl. No.: 11/745,149

(22) Filed: May 7, 2007

(65) Prior Publication Data
US 2007/0271010 A1    Nov. 22, 2007

(30) Foreign Application Priority Data
May 19, 2006    (FR) .................................. 06 51857

(51) Int. Cl.
*G06F 17/00* (2006.01)
(52) U.S. Cl. ........................................................ 701/1
(58) Field of Classification Search ................ 701/3, 701/14, 1; 340/945; 375/354, 356; 377/64, 377/66
See application file for complete search history.

(56) References Cited

U.S. PATENT DOCUMENTS

| | | | |
|---|---|---|---|
| 5,276,823 A * | 1/1994 | Cutts et al. .................... | 714/11 |
| 5,537,655 A | 7/1996 | Truong | |
| 5,778,206 A | 7/1998 | Pain et al. | |
| 6,938,183 B2 * | 8/2005 | Bickel .......................... | 714/12 |
| 2004/0078614 A1 | 4/2004 | Toillon et al. | |

FOREIGN PATENT DOCUMENTS

| | | |
|---|---|---|
| EP | 0 755 010 A1 | 1/1997 |
| GB | 2 175 717 A | 12/1986 |
| WO | WO 84/00071 | 1/1984 |
| WO | WO 02/056176 A1 | 7/2002 |

* cited by examiner

*Primary Examiner*—Yonel Beaulieu
(74) *Attorney, Agent, or Firm*—Oblon, Spivak, McClelland, Maier & Neustadt, L.L.P.

(57) ABSTRACT

A method for synchronising two asynchronous control and monitoring units of a computer, wherein each of these units comprises a computation unit. The method includes a computation of independent local Boolean signals, each having a Boolean inertia greater than the temporal uncertainties, due to the latencies in transmission between computers and the precision of the sampling controlled by the clock cycle of each unit, capable of affecting them. The method also includes an exchange, between the two units, of local signals, with each unit sending a locally computed value to the other unit, the generation of a pair of synchronised signals, in each unit, based on the local value and the value received from the other unit, and the formation of a consolidated signal based on the pair of synchronised signals.

28 Claims, 7 Drawing Sheets

METHOD AND DEVICE FOR CONSOLIDATION BY SOFTWARE SYNCHRONISATION IN FLIGHT CONTROL COMPUTERS

TECHNICAL FIELD OF THE INVENTION AND PRIOR ART

The invention relates to setting in consistency of configurations of different redundant computers in a system comprising a plurality of redundant computers.

An example of an application involves airplane flight control systems. The solution proposed is indeed implantable in the computers on-board airplanes with electric flight controls.

The invention also relates to the improvement in the strength of the flight control system of an airplane. The aspects computed, of the configuration divergence type, involve functional strings that control mode changes via switches between the different branches of a given control computation.

The divergences computed are permanent or transient.

First, the host architecture of an electric flight control system and its specific features will be briefly discussed. This essentially concerns the hardware architecture, the on-board software and the communication means.

The hardware architecture of the electric flight control system is composed of a set of redundant computers. This redundancy satisfies essentially two levels of requirements:
- a sufficient level of availability created by the criticality of the electric flight control system;
- a level of safety created by the functional requirements of the system.

The objective of availability is achieved by the coexistence of a plurality of autonomous and independent computers capable of performing the functionalities of the system, and the objective of safety is satisfied by a "fail-stop" architecture at the level of each computer.

Indeed, a number of types of computers are capable of computing a given function, and only one computer is in charge of (engaged with) said function, while the other redundant computers are waiting on this function and compute other functions.

Each computer is autonomous, has its own power supply and is controlled by its own real-time clock. These clocks are asynchronous. In addition, each computer is composed of two independent units:
- a "COMMAND" or "COM" unit, which develops the control orders and controls the actuators;
- a "MONITOR" or "MON" unit, which computes the same functionality and the same orders, optionally by using sensors and algorithms different from those of the associated "COMMAND" unit. This unit monitors the unit associated with it.

In parallel with the hardware redundancy, a software redundancy is implemented in the sense that the software of each computer is different and the software of each pair of associated units (COM, MON) is dissimilar.

As already indicated above, the two clocks are not synchronised in hardware. This asynchrony is manifested by a phase shift (or jitter), between the sampling times, and, consequently, the appearance of a jitter between the computation times. This jitter is not constant over time and is increased by the clock cycle. Indeed, the clocks are not perfectly accurate and drift over time. However, their drift is slow enough to ensure that the real time is not lost.

FIG. 1 shows a pair of such clocks and the relative drift, over time, of their pulses.

The asynchrony of the clocks that control the architecture and the communication latencies creates temporal uncertainties.

The different computers communicate with one another by buses, and buses provide the connection between the associated units of a single computer.

The communication of data by bus is characterised by transmission latencies that are non-deterministic but bounded delays. Indeed, the transmission delays are caused by the speed of the buses and are highly dependent on the load of the communications network. These delays are therefore dependent on the instantaneous state of the communication means. They are not therefore quantifiable, hence their non-deterministic character. However, the characteristics provided by the manufacturer give a maximum bound $\delta$ for these delays.

FIG. 2 shows the effects of the delays caused by the communication means. Each component of the pair of start signals (at the left in the figure) passes through a data bus and consequently undergoes a delay of less than $\delta$. The pair of signals recovered at the output of these buses (at the right in the figure) has a transient deformation manifested by a string of values (a', b')=(0, 0), (0, 1) and (1, 1). Typically, the pair (0, 1) has no physical reality and corresponds to no pair of values (a, b) of the starting pair. This example clearly illustrates the problem of non-deterministic and bounded delays.

Another aspect of the temporal uncertainties is associated with the sampling. Indeed, industrial productions in the field of electric flight controls, and more generally in all generally asynchronous systems controlled by periodic real-time clocks, are characterised by the non-determinism of the sampling. This non-determinism involves phase shifting on continuous signals and delays on discrete signals such as Boolean signals.

FIGS. 3A and 3B clearly show that the asynchronism of clocks can involve transient situations. Indeed, the situation of FIG. 3A shows a periodic sampling, with the period $C_x$, of a pair of signals. The situation of FIG. 3B shows another possible sampling of the same pair of signals by a clock of the same period $C_x$ as the first, but with a non-zero jitter. It is noted that the sampling can act as a non-deterministic transmission delay bounded by the duration of the cycle (or the period) $C_x$ of the clock considered. This observation is valid for a set of n signals with $n \geq 1$.

It is therefore understood that the effects of the temporal uncertainties on the signals passing through the hardware architecture implemented are combined and are equivalent to a general non-deterministic delay $\Delta$, bounded by:

$$\Delta < \delta + C_x$$

In the case of a flight control system, the flight control computers compute, among other things, the control commands, and monitor their validity. These commands result from control laws, which are complex functions and which often have a plurality of computation branches. They are activated according to the state of the airplane, the flight and the environment outside the aircraft.

The states of the flight control system are coded by a set of Boolean signals that qualify the availability of a resource or a function, or the passing of a certain threshold, or the validity of a measurement. The group of states of a flight control computer is called the configuration of the computer.

The states of flight control computers are logic conditions that route the choice of computation branches and the parameters of the control laws (gains, kinematics, etc.). As the associated units in a single flight control computer function in parallel, a divergence in the states of the two units can cause a divergence in the orders computed and the activation of discordance alarms.

The aspects computed, of the configuration divergence type, involve the functional strings that control the mode changes via switches between the different branches of a given computation. The divergences computed are permanent or transient.

By way of example, FIG. 4 shows a situation in which a Boolean condition B controls a switch between two computations T1 and T2, each computation being performed by a computer. This device is replicated in the two units, COMMAND (c) and MONITOR (m) and we note with X (in fact: Xc for the COMMAND portion and Xm for the MONITOR portion) the output of this algorithm. The Boolean condition is noted Bc for the COMMAND portion and Bm for the MONITOR portion.

We can take the case, for example, in which the Boolean conditions Bc and Bm result from threshold crossing logics. Therefore, if the input signal Ec is greater than a certain threshold s, Bc takes, for example, the value True. The same applies to Em and Bm. This computation is performed via a threshold crossing detection device (LD, LD').

At a constant physical input, the precision of the sensors naturally enables the inputs Ec and Em to be different. Therefore, if the physical input is sustainably in the vicinity of the activation threshold, then Bc≠Bm, resulting in a discordance downstream on the steering set points if the functions T1 and T2 are different.

A more favourable case is the one in which the inputs Ec and Em result from the same sensor or the same source. However, this does not prevent the generation of two different strings Bc and Bm, for a sufficiently long time window. The borderline case is that of the physical input in the vicinity of the threshold: then the imprecision and the coding noise can cause the same problem.

With further restrictions, and with a supposed "identical" coding between COM and MON, it is enough to have, as shown in FIG. 6, a fluctuation (even very small) in the physical input in the vicinity of the threshold, with a frequency double that of the sampling, so that the COM/MON asynchronism leads, for example, to the generation of a string 1111111 . . . in COM and 0000000 . . . in MON.

This example shows that an important dynamic in the inputs (numeric or Boolean), paired with the temporal uncertainties, potentially causes divergences in the configurations of the units of a given computer.

However, the configuration of the two units of each pair of associated units COM/MON must be, outside of a failure, the same, with close clock asynchronism. This requirement requires the computation of the Boolean signals, which code the configuration of each unit. This computation is called consolidation. In other words, to prevent divergences in the input variables, resulting, for example, from threshold logics, this consolidation technique can be used.

The Boolean consolidation consists of developing the local configuration (Boolean string) in each computation unit, exchanging it with the associated unit via a data bus and computing it so as to equalise the configurations.

Indeed, permanent differences between the configurations cause permanent differences in the control commands, and activate the monitoring at the end of the computation chain. Transient differences cause more or less substantial differences that can cause a divergence in the control command computations, in particular when they have, in their computation chains, operators that load, such as integrators, for example.

Typically, as shown in FIG. 15, if two variables are computed in parallel, the one in the COM unit and the other in the MON unit of the same EFC (electric flight control) computer, a consolidation consists of exchanging these variables via the inter-unit bus B and of performing a combinatory computation on the local variable and the variable received in each unit.

The local streams x_com and x_mon serve to compute the consolidated streams x_com_c and x_mon_c. The consolidation has two different versions:

1. The consolidation with AND logic (case of FIG. 7) serves to favour the "FALSE" ("error") value in the case of a divergence in the two local streams. This consolidation tends to inhibit the computation controlled by the state variable downstream of the computation;

2. The consolidation with OR logic serves to favour the "TRUE" ("accurate") value in the case of a divergence in the two local streams. This consolidation tends to maintain the availability of the computation controlled by the variable downstream of the computation.

This technique is intended to eliminate the transients that are capable of affecting the inputs of the sequential computations and that risk creating divergences.

The problem with this technique is that the streams consolidated in each unit are the same, with a similar clock cycle, if the streams to be consolidated are sufficiently stable or do not vary too quickly. However, as these signals are not generally stable enough—because they are dependent, for example, on threshold crossing logics—this technique produces consolidated strings that can differ in the Hamming distance sense. The Hamming distance between two strings of Booleans is the number of different bits between these two strings.

These consolidated streams are involved in other control stream computations, and therefore risk potentially causing the control units to diverge.

Another solution consists of confirming the absorbing state (true or false) for the consolidation operation.

Indeed, if the "true" state is confirmed on a signal, an inertia is introduced for its "false" state, which is the absorbing value for the AND logic gate. Similarly, if the "false" state is confirmed on a Boolean signal, an inertia is introduced for its "true" state, which is the absorbing value for the OR logic operation.

This technique makes it possible to have a common value, in COM and in MON, at least during one out of two clock cycles.

The disadvantage of this technique is that it is not precise enough, because it can have an error rate of 50%. In addition, it delays the consideration of changes in values, following the confirmation.

Consequently, the consolidations implemented in a known manner are of the combinatory type. These are point-to-point computations, without memory, often by way of a logic gate.

Other known devices protect themselves from the problems described above by using a highly synchronous architecture in the sense that all of the redundant computers are controlled by a distributed clock, as well as the communication buses. The advantage of this solution is to eliminate the temporal uncertainties. This approach promotes the use of majority-type voting devices (triplex voting).

However, this approach, by general synchronisation of the entire architecture, is costly, because it requires the use of specific material that is often relatively slow. This defect prevents the development of advanced functions and strategies, which often consume a lot of processing time and bandwidth of the communication network.

The problem to be solved is therefore that of finding a technique for consolidation of Boolean data that is insensitive to the asynchronism of the two units and to the transmission latencies, and to the dynamics of the signals to be consolidated.

DESCRIPTION OF THE INVENTION

According to the invention, to equalise the sampled Boolean signals, two associated units in a computer of a computation system reach a consensus on a common value, based on the local value of each unit and the value received by the associated unit via the communication bus.

This common value is derived from a local synchronisation computation. At a given time, each unit has a pair of values:
Bown, which is the local Boolean value;
Bopp, which is the value received from the opposite (associated) unit, but which is not always the local Boolean of the other unit.

The consolidation computation is performed on this pair of Booleans and generates a Bcc Boolean value (for Boolean consolidated in COM) and a Bmc value (for Boolean consolidated in MON).

The two consolidated signals (Bcc and Bmc) are the closest possible.

The invention also relates to a method for synchronising two asynchronous units, for control and monitoring, respectively, of a computer of a computation system comprising a plurality of computers connected to one another by communication means, wherein each of these units comprises a computation unit, which method comprises:
a computation of independent local Boolean signals, each having a Boolean inertia greater than the temporal uncertainties, due to the latencies in transmission between computers and the precision of the sampling by the clock cycle of each unit, capable of affecting them,
an exchange, between the two units, of local signals, with each unit sending a locally computed value to the other unit,
the generation of a pair of synchronised signals, in each unit, based on the local value and the value received from the other unit,
the formation of a consolidated signal based on the pair of synchronised signals.

According to the invention, a pair of coherent values is shared, which corresponds to the overlapping of stable intervals of the local Bown inputs between the associated units (COM/MON). This pair of values is refreshed by the units concerned so as to reach the consensus expected on a common and coherent pair. Each unit is therefore responsible for refreshing a component of this pair according to the dynamics of its Bown input and the dynamics of the Bopp input received.

This computation, and a device that implements it, make it possible to locally find an operation analogous to an operation in which all of the units are perfectly synchronous. Thus, the invention allows for local synchronisation, upon request, without using a general synchronisation of the entire hardware architecture.

The invention therefore proposes a method for refreshing the common copy used by the units that share it in order to perform the consolidation.

A device according to the invention comprises synchronisation means according to the invention, and makes it possible to cover all cases of failure due to a transient or permanent divergence in the control streams. The synchronisation is based on the creation of a shared virtual memory at the level of the bus, which provides communication between two asynchronous computation units implemented in the computation. This synchronisation ensures the establishment of coherence of the coded internal states of these units, by consolidated control streams. The logic gates of the prior art are replaced by a method that uses the properties of the signals to be consolidated.

The invention also relates to a computation system comprising a plurality of computers connected to one another by communication means, wherein at least one of the computers is asynchronous and comprises at least two asynchronous units, for control and monitoring, respectively, and each of these units comprises a computation unit as well as:
means for computing independent local Bown Boolean signals, each having a Boolean inertia greater than the temporal uncertainties capable of affecting them,
means for exchanging, or at least one exchanger, between the two units, local signals, wherein each unit sends a locally calculated value to the other unit,
means for generating, or at least one generator, a pair of synchronised signals, in each unit, based on the local value and the value received from the other unit,
means for forming a consolidated signal based on the pair of synchronised signals.

The local signals can be computed by different algorithms based on different sensors, or result from logics associated with sensors, for example of the threshold crossing type, or computations performed by other computers.

They preferably each have a Boolean inertia greater than twice the non-deterministic delay capable of affecting them.

The connection between the two asynchronous units can be provided by an inter-unit bus and/or by a cable-type connection.

Similarly, the communication means between the computers can comprise at least one inter-unit bus and/or at least one cable-type connection.

A method and a device according to the invention implement a robust refresh method.

According to an embodiment, this method makes it possible, for each unit, to:
detect a change in value of an input among the actual Boolean signal (Bown) of said unit and the signal (Bopp) received from the other unit,
maintain a internal counter in the unit,
retain a certain stable value,
refresh this value on a given condition.

Each unit i can implement a counter ($n_i$), initially at an initial state ("0"), and such that, if this unit i sees one of its own inputs (Bown) change, and no inputs of the other units (Bopp) change, it distributes the change of its input by refreshing its output (Bowndiff) to one of the other units and positions its counter at a fourth state.

The counter can be such that, if $n_i=0$, and if the unit i sees changes in Bopp inputs of the other units, it distributes the change of its input by refreshing its output (Bowndiff) to one of the other units and positions its counter at a third state.

In each step, each unit decrements its counter, down to the initial state.

When $n_i=1$, each unit i executes the refresh operation of its local pair by a pair of refreshed values.

The plurality of computers can be used in an electric flight control system.

DETAILED DESCRIPTION OF EMBODIMENTS OF THE INVENTION

Figure 7:
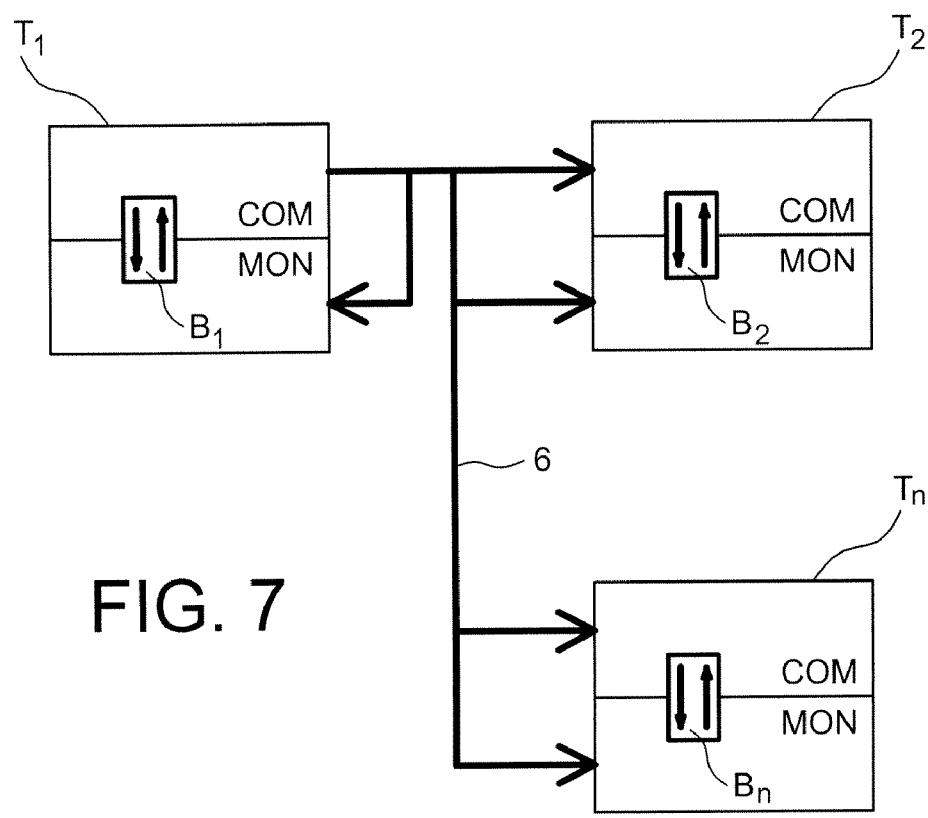
FIG. 7 shows a hardware architecture of an electric flight control system to which the invention is applied.

FIG. 7 shows a hardware architecture of a control system 2, its breakdown into redundant computers and the COM/MON principle, wherein the redundancy makes it possible to satisfy the conditions of availability and/or safety, as already presented above.

The different computers are identified by the references C1, C2, ... Cn. Communication means 6 ensure the exchange of information between the different components of this asynchronous architecture.

In a single computer, the two computation units (COM1, MON1; COM2, MON2; ... ; COMn, MONn), connected by an inter-data bus B1, B2, ... , Bn, are asynchronous; each unit has its own real-time clock, and the various clocks are not synchronised together. This lack of synchronisation poses the problems indicated in the introduction to this application and to which this invention provides a solution.

Figure 8:
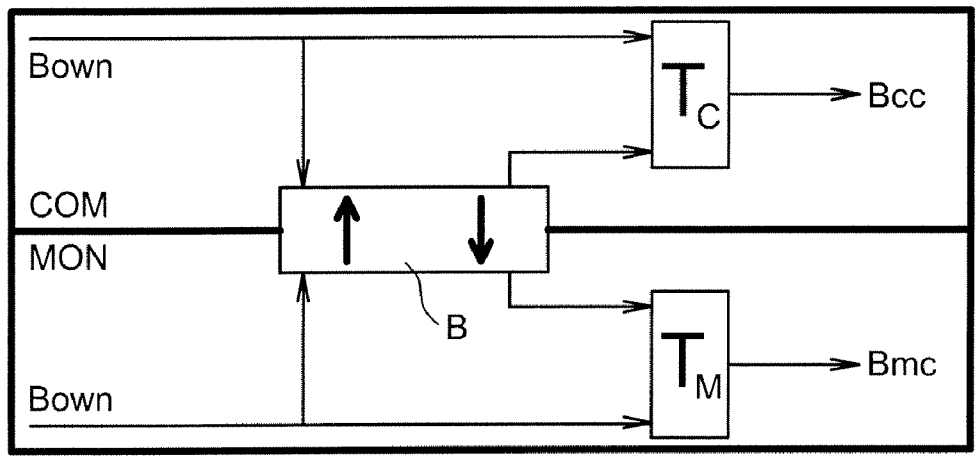
FIG. 8 shows a general architecture of a device to which the invention is applied.

The general architecture of one of the computers C1, C2, ... Cn is shown in FIG. 8. It comprises two units COM and MON each comprising a computation unit Tc and Tm.

In the case of a flight control computer, one of these units ("COMMAND" or "COM") develops the control orders and controls the actuators, while the other ("MONITOR" or "MON") calculates the same functionality and the same orders, possibly by using sensors and computations different from those of the associated "COMMAND" unit. This unit monitors the "COMMAND" unit associated with it.

The different computers are interconnected by data buses. The communication between the computers implements a periodic sampling for the reading of the input buses, and a periodic blocking, of the zero-order block type, for writing on the output buses. The sampling and the blocking are controlled by real-time periodic clock pulses, i.e. by the activation of programs by these clocks. This type of communication is non-blocking because the asynchronous computers periodically scan their input buses and no synchronisation is required to take into account the changes in values issued by the communication means.

There are two types of data buses:
Inter-computer buses 6 provide the connection between the computers. These buses come from a unit of a given computer to the other computer and are looped back to the unit associated with the transmitting unit.

Inter-unit buses B1, B2, ... Bn provide the connection between associated units within the same computer.

The connections between computers and/or the inter-unit connections can be provided by cables, or, simultaneously, by one or more cables and one or more buses.

A consolidation computation according to the invention comprises three steps:

1. In the first step, the local Bown Boolean signals are computed in each unit COM and MON. These two signals are, in principle, independent, because they are computed by different algorithms based on different sensors or computers. In the case of sensors, they can be of any type, for example of the threshold crossing type.

2. In a second step, between the two units COM and MON, an exchange of local signals, or a signal computed on the basis of local signals, is carried out. Each unit sends its Bown value, or a value computed on the basis of this Bown value, computed locally, to the other unit.

3. In a third step, a consensus is reached, in each unit, on the basis of the local value and the value received from the associated unit, and a pair of synchronised signals is generated. This pair will serve to produce the consolidated signal: this is the actual consolidation operation.

The consolidation makes it possible to equalise the two consolidated streams with a close jitter, of the clock. The invention enables this consolidation: a common copy of the streams to be consolidated on the inter-unit bus Bi is kept virtually, and acts as a shared memory. Indeed, a sufficient condition for having equal consolidated strings is that the same inputs be applied to the consolidation algorithms in the two units.

In consideration of the properties of the architecture that receives the computations considered, the proposed solution is based on the time properties of the signals to be consolidated. As already indicated above, the combination of the sampling uncertainties and the transmission latencies on the communication means (bus, for example) can be assimilated to a delay that is non-deterministic but bounded by:

$$\Delta < \delta + C_x$$

where $\delta$ and $C_x$ are respectively the delay caused by the transmission delay of the bus and the clock cycle. Between two units of the same computer, the clocks can be different and asynchronous, but also periodic with the same period $C_x$. Therefore, there is only one $C_x$ that is the period of execution of the synchronisation algorithm. This period is the same in the COM unit and in the MON unit.

Figure 9A:
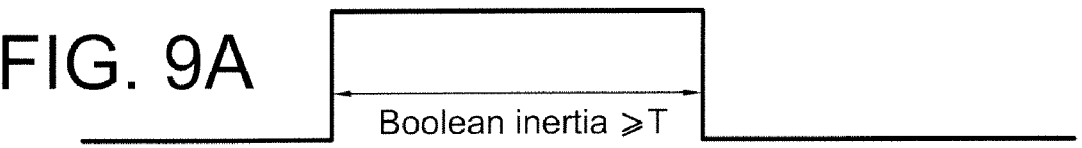
FIGS. 9A and 9B show an overlap in the stable portions of two signals.
Figure 9B:
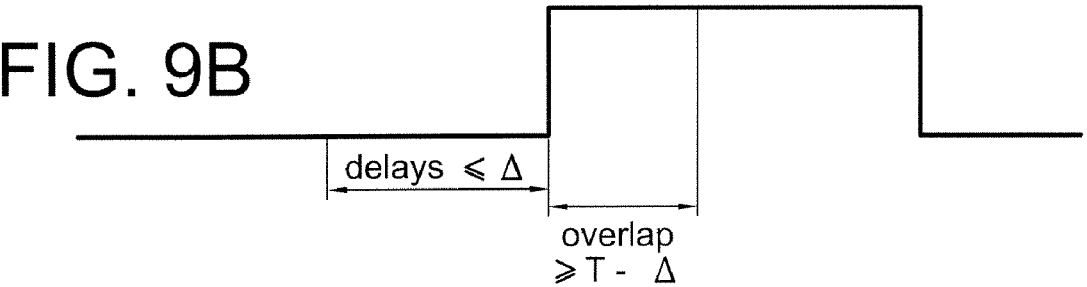

If the signals to be consolidated have a minimum Boolean inertia, i.e. a minimum interval of stability T between two successive changes in values, there is an overlap interval of the stable portions of the signals considered. In other words, when the signal takes a value, it keeps this value for a duration at least equal to T. Due to this overlap (shown in FIGS. 9A and 9B), there is, in each computation period, a time or a duration in which the two units see the same signal pair. This pair of values (coherent) is visible from the two units during a long enough time for them to work, in a sampled operation, with the same common pair.

A sufficient condition for ensuring the existence of a coherent overlap (deterministic) in a given unit is to consider signals that have a greater Boolean inertia than the temporal uncertainties capable of affecting them. Hence, the following relation (1):

$$T > \Delta$$

The overlap interval has a duration equal to at least T−Δ. The two variables that influence Δ (δ and Cx) are known, and T can be adjusted to satisfy the above condition.

To ensure a coherent overlap seen by the two units, the overlap should be perceived in the same manner by the two units that exchange the signals to be consolidated. The following condition (2) makes it possible to achieve this objective:

$$T > 2 \times \Delta$$

Here again, T can be adjusted to satisfy this condition.

Therefore, each unit (TC and TM in FIG. 8) retains a stable copy (slow dynamics) of its input that it distributes and that it uses for its computations. Indeed, the property of stability (inertia) is artificially created on the inputs, considering that the data streams to be consolidated are stable during their computation cycle. For this, the consolidation computations and the COM/MON exchanges are faster than the variation speed (computation cycle) of the Booleans to be consolidated.

It is possible to consider the example of local Bown Booleans produced by periodic computations of period $T = C_{prod}$. These Boolean signals have a minimum inertia of $C_{prod}$ (the signal cannot vary before $C_{prod}$). To verify the overlap condition, temporal uncertainties Δ that are strictly smaller than half of $C_{prod}$ are considered. The period $C_{prod}$ of production of local Bown variables is generally different from the value Cx. The conditions indicated above are statically verified by varying the period of production of the local variables $C_{prod}$ in order to adjust their period of stability, or inertia, T because $T \geq C_{prod}$.

Figure 10:
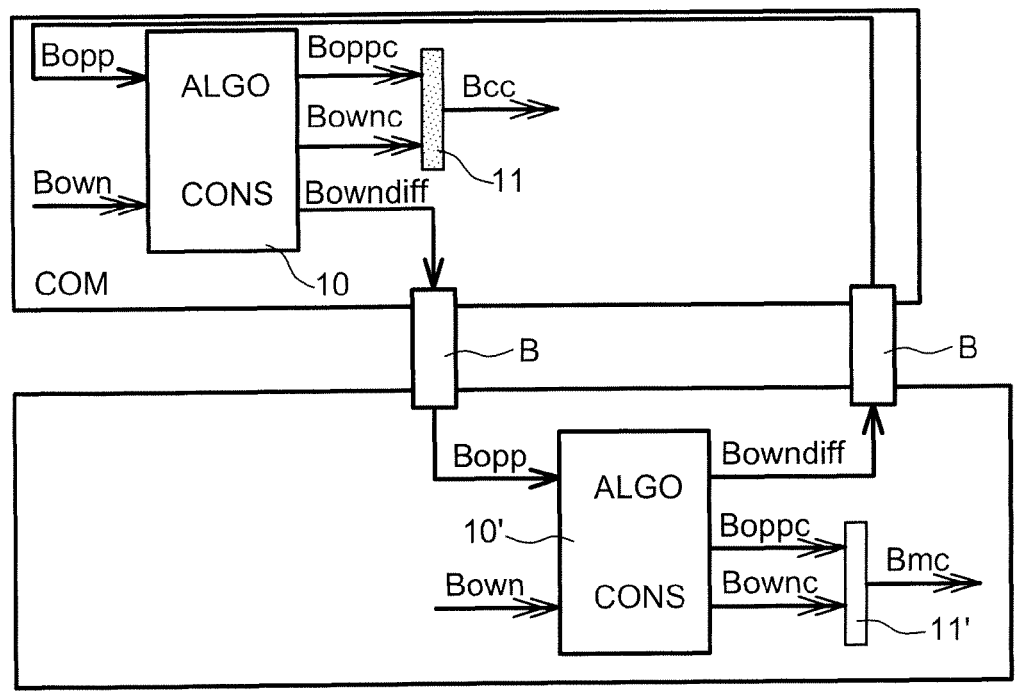
FIG. 10 shows the principle of an accurate consolidation.

FIG. 10 is a diagram of a device for consolidation of a computer i according to the invention:

Each unit (COM and MON) has a local Boolean or specific Bown and receives a Boolean Bopp signal from the opposite unit via the inter-unit bus Bi.

The means or the device 10, 10' for synchronisation produces a triplet (Bownc, Boppc, Bowndiff).

The Boolean signal Bowndiff makes it possible to refresh the pair distributed at the level of the bus B and sent to the other unit of the computer.

The pair of signals (Bownc, Boppc) is the same in each unit, with the close clock asynchronism, and represents the pair of coherent values sought.

The means 11, 11' are logic gates. It can be an AND gate if the choice is made by a "safety"-oriented computation, or an OR gate if the choice is made by an "availability"—oriented computation. The synchronisation means 10 paired with the logic gate 11 together forms the signal consolidation means.

Figure 1:
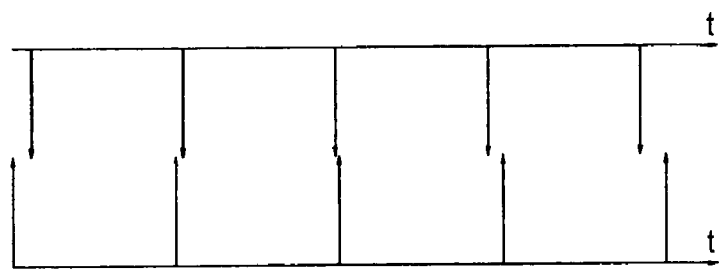
FIG. 1 shows a background art example two clocks in real time.
Figure 2:
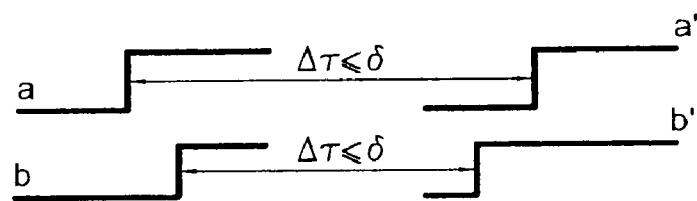
FIG. 2 shows a background art example the effects of delays caused by communication means.
Figure 4:
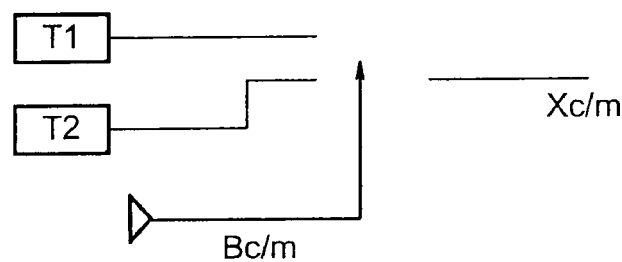
FIG. 4 shows a background art example two computation units and a Boolean condition for controlling a switch between these two computations.
Figure 3A:
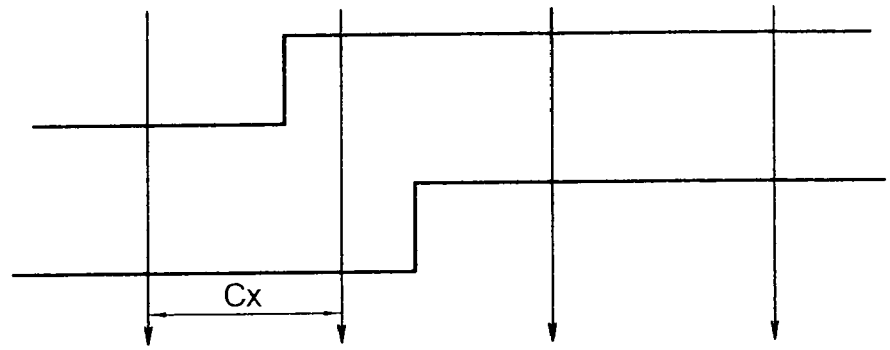
FIGS. 3A and 3B show a background art example the effect of the clock asynchronism on the sampling.
Figure 3B:
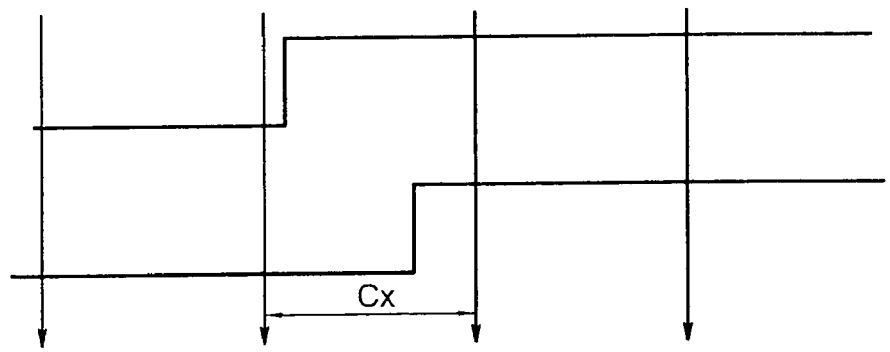
Figure 6:
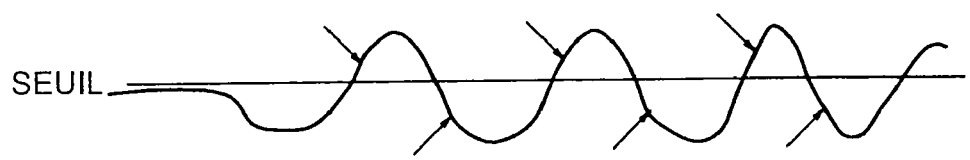
FIG. 6 shows the fluctuations of a physical input in the vicinity of a threshold.
Figure 5A:
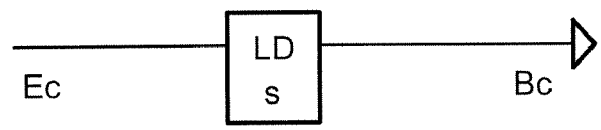
FIGS. 5A and 5B show the generation of two Boolean conditions based on threshold crossing logics.
Figure 5B:
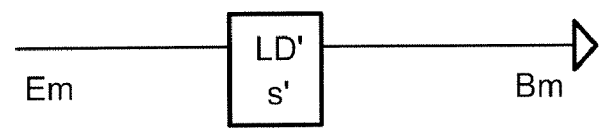

In FIG. 5, the double arrows represent reading phases, while the single arrows represent writing phases.

A robust refresh method (i.e. insensitive to the uncertainties not modelled during the design; in this case, robustness with regard to temporal uncertainties (latency, clock asynchronism)) according to the invention, implemented by such a device, can be described as follows:

1. Each unit i (in FIG. 8: COM unit or MON unit) has a counter ni. Initially, these counters are in state "0" (the numeric identifications of the states are indifferent; the various states could just as well have been called "a", "b", "c" and so on), which corresponds to an idle state (stable inputs); as long as none of the input signals of the unit i varies, this counter remains at 0.

2. Based on the state ni=0: if the unit i sees one of its own Bown inputs change, and no Bopp inputs of the other units changes, it distributes the change of its input by refreshing Bowndiff and positions its counter to state "3".

3. Based on the state ni=0: if the unit i sees a change of Bopp input coming from at least one other unit, it distributes, independently of any change of its own local Bown signal, the change of its input by refreshing Bowndiff and positions its counter to state "2". In other words, Bopp then determines the distribution of Bown to the other unit. The direct passage from n=0 to n=2 makes it possible to accelerate the method by "short-circuiting" state n=3. Indeed, the prior method functions at isospeed, i.e. at constant speed, for production of local signals, exchange and consolidation. It is not the four-state or four-time aspect of the method that allows for acceleration of the method. The four-state aspect of the method requires an acceleration that involves the periods, or speeds, of execution of the means 10, 11 and B with respect to the production speed of the local Bown signals in order to ensure the validity of the fundamental condition T>2×Δ. State n=3 is short-circuited because if Bopp changes, it means that the opposite unit has its counter positioned at state "3" and will go to state "2". Therefore, synchronisation is achieved by putting the local counter at state "2". The two units become synchronous over this computation with the close clock asynchronism.

4. Then, in each step, each unit decrements its counter, down to 0.

5. When ni=1, each unit i executes the refresh operation of its local pair (Bownc, Boppc) by the pair (Bowndiff, Bopp), with Bopp corresponding in fact to the Bowndiff signal of the other unit. A stable phase, or consensus, is reached.

In other words, the Bowndiff value is modified or refreshed at each change of Bown or Bopp when coming from a stable phase, i.e. ni=0, or each time n=2 or n=3.

It is not the local Bown configuration of each unit that is sent to the other unit, but a configuration (Bowndiff) that is different from Bown from the temporal perspective, since it is synchronised by the Bown as well as the Bopp modifications.

Such a method is applicable to a plurality of units and not only to two COM and MON units. In this case, each Bown signal is in fact a column matrix of signals Bown1, Bown2, Bown3, Bown4, . . . , and each Bopp signal is a column matrix of signals Bopp1, Bopp2, Bopp3, Bopp4, . . . A Bown modification corresponds to a modification of at least one of its components, and a Bopp modification also corresponds to a modification of at least one of its components.

Figure 11:
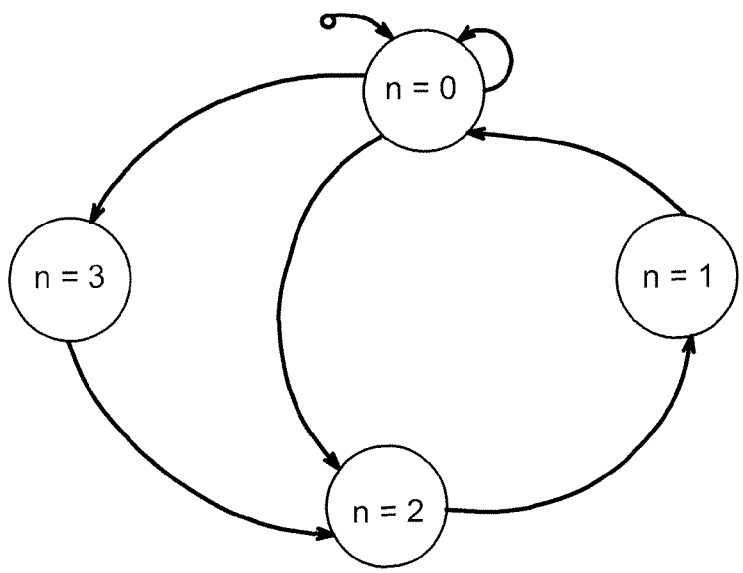
FIG. 11 shows a sequential implementation of a refresh algorithm.

FIG. 11 shows a sequential implementation, in a finite-state automaton, of this method, which makes it possible to:
  detect a change in value of a Bown or Bopp input;
  maintain the internal counter of the unit, i.e. cause it to change, put it at a given value, decrement it, etc.;
  retain a certain stable value (Bowndiff),
  refresh this value on a given condition (change of one of the Bopp and Bown inputs); this is the case for states n=2 and n=3.

It is therefore a diagram with four states:
  an initial state;
  two states (n=3 and n=2) that can be reached from the initial state;
  a stable state or consensus n=1, which can change only to state n=0, and which is reached only from state n=2.

From a state k (≠0), it goes to state k−1, then to state k−2 if k−1≠0.

Figure 12:
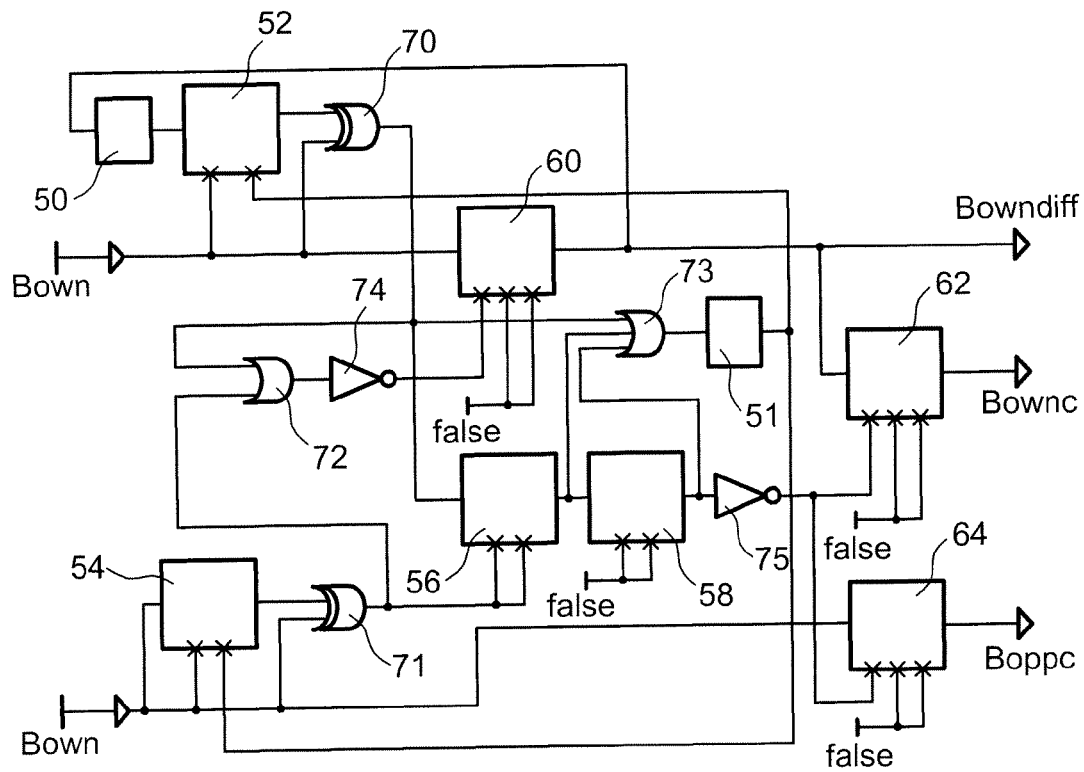
FIG. 12 shows a detailed implementation of a synchronisation algorithm.

A method according to the invention can be implemented by a circuit of FIG. 12, which in fact represents an embodiment of each of the means 10, 10' of FIG. 10. In this figure:

each of the "FBY" means 50, 51 forms a pure delay of a computation cycle;

each of the "prev" means 52, 54, 56, 58 generates a pure delay of a computation cycle, but that can be initialized on a Boolean condition. This operator serves to implement the counter of the corresponding COM or MON unit;

each of the "memb" means 60, 62, 64 is a Boolean memory. Indeed, if the activation condition (the first connection at the bottom and to the left of each of the "memb" means) is true, the cell freezes its output at its last value. If this condition is false, the cell passes its input to its output, thus comprising a simple connection wire. The operation of this cell is shown in relation to FIG. 14.

The device also comprises "exclusive-OR" gates 70, 71, "OR" gates 72, 73 and inverters 74, 75.

The means 50, 52, 70 make it possible to calculate the condition n ~3, if the counter was at 0 at the previous time and if Bown has changed its value.

The means 54 and 71 compute the condition n=2, if the counter was 0 at the previous time and if Bopp has changed its value.

The means 72, 74 make it possible to develop the condition (n≠3 and n≠2). If this condition is "true", the storage means 60 keep Bowndiff at its last value; otherwise Bowndiff is refreshed by Bown.

uncertainties. Indeed, the relationship that associates the inertia of the inputs with the time uncertainties enables an excellent equality to be achieved, or even a perfect equality, with the close clock asynchronism, of the signals computed by the proposed method.

Figure 14:
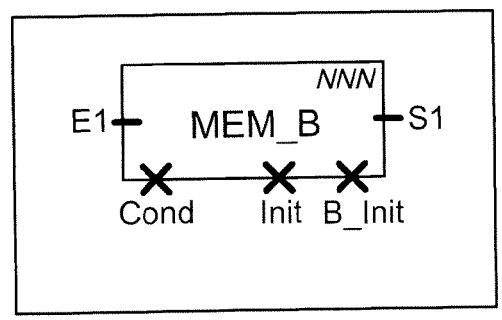
FIG. 14 shows a graphic representation of means for storing a Boolean value.

FIG. 14 shows a Boolean memory and its operation. The symbol MEM_B( ) is used to store a Boolean value.

The parameter NNN is the number of occurrences of the symbol.

The input value $E_1$ is a constant or variable Boolean value.

The three cached inputs Cond, Init and B_Init are respectively:

a constant or variable Boolean value that defines the Boolean activation of the symbol;

a constant or variable Boolean value that defines an initialization value of the memory;

a constant or variable Boolean value that defines the Boolean initialization of the memory.

The output value $S_1$ is a Boolean value.

The memory functions as follows:

initialization phase:

If B_Init=True, then $S_1(k)=Init(k)$

Otherwise: Computation

Computation:

If Cond(k)=True, then $S_1(k)=S_1(k-1)$

Otherwise: $S_1(k)=E_1(k)$

A test diagram has been established:

Init=False

| B_int | 1 | 1 | 1 | 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|---|---|---|
| $E_1$ | 1 | 1 | 1 | 1 | 1 | 0 | 0 | 1 | 0 | 1 | 1 | 1 | 1 | 0 | 1 | 0 | 1 | 0 | 0 | 1 |
| Cond | 1 | 0 | 1 | 1 | 0 | 0 | 1 | 1 | 1 | 1 | 0 | 0 | 0 | 0 | 1 | 1 | 1 | 1 | 0 | 0 |
| $S_1$ | 0 | 0 | 0 | 0 | 1 | 0 | 0 | 0 | 0 | 1 | 1 | 1 | 1 | 0 | 0 | 0 | 0 | 0 | 0 | 1 |

The means 56 produce the condition n=2, and the means 58 produce the condition n=1.

The means 73 produce the condition (n=3 or n=2 or n=1), which is equivalent to n≠0.

The means 51 introduce a timing making it possible to ensure that the computations are done so that only one step is done per computation cycle.

The means 75 produce the condition n≠1.

The means 62 and 64 are controlled by the same storage condition, i.e. the output of means 75 (n≠1). If this condition is false, these symbols are turned on and the synchronised pair (Bownc, Boppc) is refreshed.

The operation shown in FIGS. 13A to 13D represents two signals with a Boolean inertia greater than four computation cycles. They undergo a communication delay of less than one computation cycle and sampling uncertainties of less than one computation cycle. The numbers at the bottom of each clock pulse show the value of the counter of each unit.

Figure 13A:
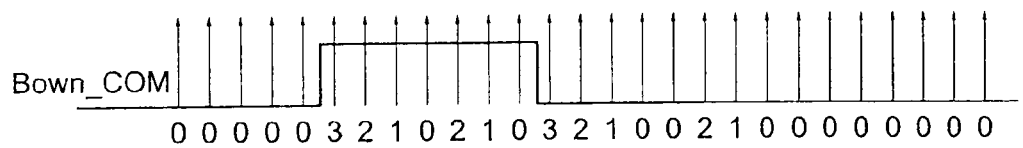
FIGS. 13A - 13D show example embodiments.
Figure 13B:
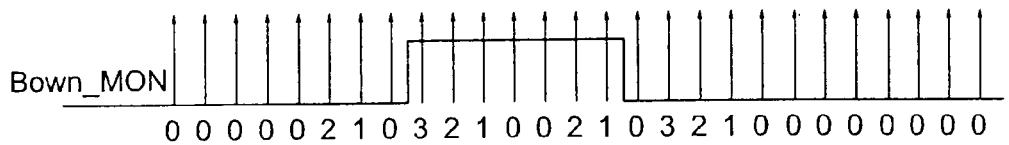
Figure 13C:
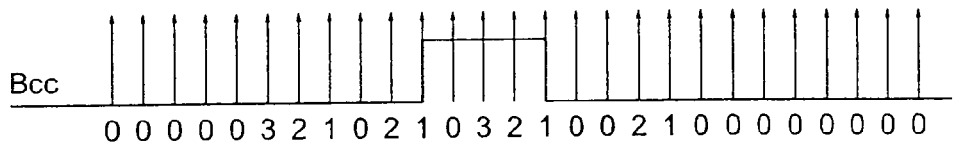
Figure 13D:
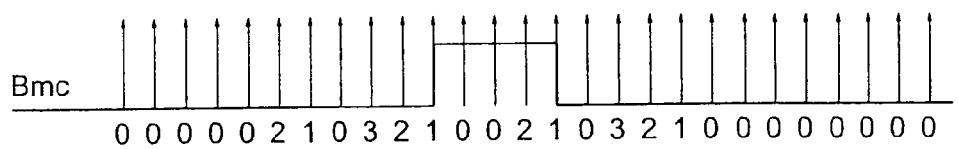
Figure 15:
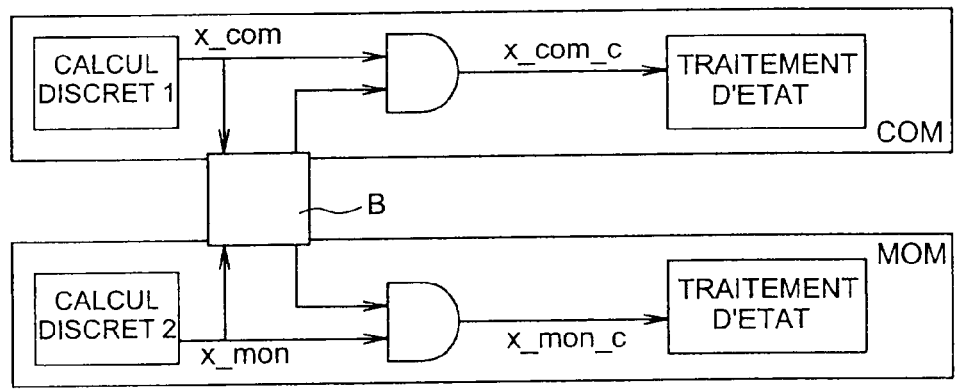
FIG. 15 shows means for consolidation by AND gates, known from the prior art.

The two signals of FIGS. 13A and 13B show the original signals that are computed locally in each unit. The two signals of FIGS. 13C and 13D give the result of the consolidation by an AND logic gate.

This figure shows that the consolidated

Booleans (Bcc and Bmc) are the same, with the close clock asynchronism.

As seen in the previous example of operation, the application of the algorithm performs a synchronisation on request of the two COM and MON units. This synchronisation has the specific feature of being robust by construction with temporal The invention also applies to (triplex, triplex)-type architectures. It is then simply necessary to implement two Bopp inputs in order to cover the triplex (three-computers architecture with three units per computer).

The invention makes it possible to improve the asynchronous architecture by synchronising only specific functions, by an approach that is clearly less expensive than a general synchronisation of the entire hardware architecture.

The invention proposes, among other things, techniques and methods for designing flight control systems robustly by construction. By robustness, we mean the insensitivity of a computation to uncertainties and non-modelled dynamics within the limits of the functional requirements of the system concerned.

The proposed invention provides a generic and general technique for computing the temporal uncertainties of GALS (Globally Asynchronous Locally Synchronous) architectures. There are multiple fields of application, and they are not limited to the consolidation of two asynchronous units. Indeed, the proposed technique is applicable to other fields, such as space, defence and more generally to any system distributed on a GALS architecture without general hardware or software synchronisation.

It should be noted that the description provided with two Boolean signals can naturally be extended to other possible cases, in particular to a number of signals greater than two.

The invention proposes a systematisation of the use of variability (stability) properties on streams to be consolidated in order to regain robustness. Certain computations can produce highly dynamic Boolean streams. The transformation of these signals into stable streams promotes the addition of delays via confirmers or monostables. This transformation creates delays on the control streams, which are not generally desirable for reasons of reactivity. Therefore, the invention solves the problem at its source.

A speed improvement is achieved by accelerating speeds in order to satisfy the fundamental relation $T>2\times\Delta$. Indeed, if $C_{prod}=T=40$ ms for example, it is sufficient to have $Cx+\Delta<T/2=40/2=20$ ms. Therefore, the algorithm is executed at a speed $Cx=10$ ms and the exchanges are accelerated with this same period $Cx$. As the supplier data for the communication means specify that $\Delta<10$ ms, we therefore have $T/2>\Delta+Cx$. The accelerations are therefore achieved by adjusting the speeds of execution $Cx$ of the algorithm and exchanges as well as the speed of production $Cprod=T$ of the local signals.

The invention claimed is:

1. A method for synchronising two asynchronous COM and MON units, for control and monitoring, respectively, of a computer of a computation system comprising a plurality of computers connected to one another by a communication connection, wherein each of the COM and MON units comprises a computation unit, the method comprising:
   computing independent local Boolean signals, each having a Boolean inertia greater than temporal uncertainties, due to latencies in transmission between computers and precision of a sampling controlled by a clock cycle of each of the COM and MON units, capable of affecting them,
   exchanging, between the COM and MON units, of local signals, with each of the COM and MON units sending a locally computed value to the other unit,
   generating a pair of synchronised signals, in each of the COM and MON units, based on its locally computed value and the computed value received from the other unit,
   forming a consolidated signal based on the pair of synchronised signals.

2. The method according to claim 1, the local signals being computed by different algorithms based on different sensors, or a result from logics associated with sensors.

3. The method according to claim 1, the local signals each having a Boolean inertia greater than twice a non-deterministic delay capable of affecting them.

4. The method according to claim 1, the connection between the two asynchronous units being provided by an inter-unit bus and/or by a cable-type connection.

5. The method according to claim 1, the communication connection between the computers comprising at least one inter-unit bus and/or at least one cable-type connection.

6. The method according to claim 1, implementing a robust refresh method.

7. The method according to claim 6, each of the COM and MON units:
   detecting a change in value of an input among the actual Boolean signal of said unit and the signal received from the other unit,
   maintaining an internal counter in the unit,
   retaining a certain stable value,
   refreshing this value on a given condition.

8. The method according to claim 1, each of the COM and MON units being designated by i and implementing a counter ni, initially at an initial state ni=0, and such that, if the unit i sees one of its own inputs change, and no inputs of the other units change, it distributes the change of its input by refreshing its output to one of the other units and positions its counter at third state ni=3.

9. The method according to claim 8, the counter being such that, if ni=0, and if the unit i sees changes in inputs of the other units, it distributes the change of its input by refreshing its output to one of the other units and positions its counter in a second state ni=2.

10. The method according to claim 8, in which, in each step, each unit i decrements its counter, down to the initial state ni=0.

11. The method according to claim 9, in which, in each step, each unit i decrements its counter, down to the initial state ni=0.

12. The method according to claim 10, in which, when ni=1, each unit i executes the refresh operation of its local pair of signals synchronised by a pair of refreshed values.

13. The method according to claim 11, in which, when ni=1, each unit i executes the refresh operation of its local pair of signals synchronised by a pair of refreshed values.

14. The method according to claim 1, the plurality of computers belonging to an electric flight control system.

15. A computation system comprising a plurality of computers connected to one another by a communication connection wherein at least one of the computers is asynchronous and comprises at least two asynchronous COM, MON units, for control and monitoring, respectively, each of these units comprising a computation unit as well as:
   a computing unit configured to compute independent local Boolean signals, each having a Boolean inertia greater than temporal uncertainties capable of affecting them,
   an exchanging unit configured to exchange between the two units COM and MON, local signals, wherein each unit sends a locally calculated value to the other unit,
   at least one generator of a pair of synchronised signals, in each of the COM and MON units, based on its locally computed value and the computed value received from the other unit, and
   a forming unit configured to form a consolidated signal based on the pair of synchronised signals.

16. The system according to claim 15, the communication connection between the two computation systems comprising at least one inter-unit bus and/or one cable-type connection.

17. The system according to claim 15, a communication connection between the COM and MON units comprising at least one inter-unit bus and/or one cable-type connection.

18. The system according to claim 15, implementing a robust refresh method.

19. The system according to claim 18, further comprising:
   a detection unit configured to detect a change in value of an input;
   a maintaining unit configured to maintain an internal counter of the unit;
   a retaining unit configured to retain a certain stable value, and
   a refreshing unit configured to refresh this value on a given condition.

20. The system according to claim 15, each of the COM and MON units being designated by i and comprising a counter ni, initially at an initial state ni=0, and being configured so that, if this unit i sees one of its own inputs change, and no inputs of other units change, it distributes the change of its input by refreshing its output to one of the other units and positions its counter at a third state ni=3.

21. The system according to claim 20, the counter being configured so that, if ni=0, and if the unit i sees changes of inputs of the other units, it distributes the change of its input by refreshing its output to one of the other units and positions its counter at a second state ni=2.

22. The system according to claim 20, in which, in each step, each unit i decrements its counter, down to 0.

23. The system according to claim 21, in which, in each step, each unit i decrements its counter, down to 0.

24. The system according to claim 22, being configured so that, when ni=1, each unit i executes the refresh operation of its local pair by a pair of refreshed values.

25. The system according to claim 23, being configured so that, when ni=1, each unit i executes the refresh operation of its local pair by a pair of refreshed values.

26. The system according to claim 20, the computer belonging to an electric flight control system.

27. An aircraft comprising a device capable of implementing the method according to claim 1.

28. An aircraft comprising the system according to claim 15.

* * * * *